(12) United States Patent
Suzuki

(10) Patent No.: US 6,819,062 B2
(45) Date of Patent: Nov. 16, 2004

(54) DISCHARGE LAMP LIGHTING APPARATUS, LIGHT SOURCE APPARATUS AND PROJECTION TYPE DISPLAY APPARATUS

(75) Inventor: Toshio Suzuki, Kanagawa (JP)

(73) Assignee: Sony Corporation, Tokyo (JP)

(*) Notice: Subject to any disclaimer, the term of this patent is extended or adjusted under 35 U.S.C. 154(b) by 16 days.

(21) Appl. No.: 10/341,236

(22) Filed: Jan. 13, 2003

(65) Prior Publication Data
US 2003/0173910 A1 Sep. 18, 2003

(30) Foreign Application Priority Data
Jan. 17, 2002 (JP) ..................... P2002-009004

(51) Int. Cl.⁷ ............................ H05B 37/02; G05F 1/00
(52) U.S. Cl. ................. 315/291; 315/224; 315/308; 315/362
(58) Field of Search ................. 315/291, 308, 315/224, 362, 128, 307, 209 R, 360, 244, 247, DIG. 7

(56) References Cited

U.S. PATENT DOCUMENTS 5,254,992 A * 10/1993 Keen et al. ............... 341/119
6,127,789 A * 10/2000 Ishizuka et al. ........... 315/308
6,504,323 B2 * 1/2003 Yuda et al. ............... 315/307
6,670,780 B2 * 12/2003 Ono et al. ................. 315/291

* cited by examiner

Primary Examiner—Tuyet Vo
Assistant Examiner—Chuc Tran
(74) Attorney, Agent, or Firm—Jay H. Maioli

(57) ABSTRACT

A circuit for supplying an ignition voltage to a discharge lamp includes a capacitor for charging a supplied voltage, a transformer for stepping-up the charged voltage of the capacitor, a switching device for switching whether a voltage is supplied from the capacitor to the transformer, and a thermistor, wherein the discharge lamp is supplied with an ignition voltage of a higher voltage than that of a normal voltage when the temperature of the discharge lamp is high. Accordingly, it becomes possible to light the discharge lamp when it is in a high temperature condition such as when turning on the discharge lamp again just after it was turned off, and the life time of the discharge lamp can be lengthened.

9 Claims, 5 Drawing Sheets

DISCHARGE LAMP LIGHTING APPARATUS, LIGHT SOURCE APPARATUS AND PROJECTION TYPE DISPLAY APPARATUS

BACKGROUND OF THE INVENTION

1. Field of the Invention

The present invention relates to an discharge lamp lighting apparatus, a light source apparatus, a liquid crystal display (LCD) projector using a discharge lamp as a light source and the like, and more particularly to those where the lighting characteristic is much improved.

2. Description of the Related Art

In an LCD projector a discharge lamp is usually used as a light source for irradiating an LCD panel.

As widely known in the art, a discharge lamp is formed by enclosing high pressured gas into a tube shaped or valve shaped glass and light emission (lighting) is performed by applying a high voltage pulse (ignition voltage), ionizing the gas and supplying dive current thereto such that a continuous current conducts through the ionized gas.

In a discharge lamp lighting apparatus there is included a circuit (ignition circuit) for generating an ignition voltage and supplying it to the discharge lamp. In a conventional discharge lamp lighting apparatus, a fixed voltage level (voltage level which fits the watt power of the discharge lamp to be lighted) is generated as an ignition voltage and supplied to the discharge lamp.

FIG. 1 shows a typical constitution of an ignition circuit in a conventional discharge lamp lighting apparatus. A power supply line to which approximately 300V of DC voltage is supplied is grounded by means of a resistor R11 and a capacitor C11.

A connection midpoint between the resistor R11 and the capacitor C11 is connected to one terminal of a primary coil of a step-up transformer T11 by means of a discharge device H11 such as a SIDAC. The other terminal of the primary coil of the step-up transformer T11 is grounded.

One terminal of the secondary coil of the step-up transformer T11 is grounded and the other terminal thereof is connected to one terminal of a primary coil of a step-up transformer T12 by means of a diode D11 and a discharge gap H12. A connection midpoint between the diode D11 and the discharge gap H12 is grounded via a capacitor C12. The other terminal of the secondary coil of the step-up transformer T12 is grounded.

A discharge lamp 110 is attached to the lighting apparatus such that one of the electrodes thereof is connected to one terminal of the secondary coil of the step-up transformer T12.

Additionally a signal line for supplying an AC drive current from a full-bridge circuit (not shown) to the discharge lamp 110 is connected to the secondary coil of the step-up transformer T12.

According to this ignition circuit, approximately 300V of DC voltage from the power supply line is charged in the capacitor C11 through the resistor R11. When the charged voltage of the capacitor C11 attains to a discharge stat voltage of the discharge device H11, a voltage is supplied from the capacitor C11 to the primary side of the step-up transformer T11 and a stepped-up voltage obtained at the secondary side of the step-up transformer T11 is supplied to the capacitor C12 through the diode D11.

Then, when the charged voltage of the capacitor C12 attains to a discharge stat voltage of the discharge device H12, a voltage pulse is supplied from the capacitor C12 to the primary side of the step-up transformer T12 and a stepped-up voltage pulse obtained at the secondary side of the step-up transformer T12 is supplied to the discharge lamp 110 as an ignition voltage.

In this way an ignition voltage having a fixed voltage which is determined by the discharge stat voltage of the discharge device H12 is supplied to the discharge lamp 110.

However, supplying an ignition voltage having a fixed voltage to the discharge lamp has inconvenience mentioned below.

Namely, when an LCD projector is turned off after it is used for long hours and then the projector is soon or at once turned on again, the temperature of the discharge lamp is kept very high.

When the temperature of the discharge lamp is high in such a condition, the pressure of the low pressured gas which is enclosed in the glass of the discharge lamp increases, so that the discharge lamp cannot be lighted or turned on unless an ignition voltage of a higher voltage than that of normal temperature is supplied to the discharge lamp.

Accordingly, the discharge lamp cannot be lighted at a high temperature if the voltage level of the ignition voltage is fixed to a low voltage level which is sufficient for lighting the discharge lamp at a normal temperature. As a result when the LCD projector is turned off after it is used for long hours and then it is soon turned on again, the video image cannot be projected, so that users are inconveniently forced to wait until the temperature of the discharge lamp decreases.

On the other hand, if the voltage level of the ignition voltage is fixed to a high voltage level which is necessary for lighting the discharge lamp at the high temperature, a high voltage level of the ignition voltage is supplied unnecessarily at the normal temperature, so that the electrodes of the discharge lamp become deteriorated and it cases shortening of the life time of the discharge lamp.

SUMMARY OF THE INVENTION

In view of the aforesaid problem, the purpose of the present invention is to provide a lighting apparatus for an discharge lamp, a light source apparatus and a projection type display apparatus where the discharge lamp can be lighted or turned on also at a high temperature, the discharge lamp can be easily lighted regardless of the temperature and the life time thereof can be lengthened.

The present applicant proposes a discharge lamp lighting apparatus which comprises means for supplying a high voltage pulse (ignition voltage) to a discharge lamp, means for supplying a drive current to the discharge lamp, detecting means for detecting the temperature caused by the heat radiation of the discharge lamp, and control means for changing the voltage level of the ignition voltage in response to the detected result of the detecting means.

According to this discharge lamp lighting apparatus, the temperature caused by the heat radiation of the discharge lamp is detected by the detecting means and the voltage level of the ignition voltage is changed by the control means.

Accordingly, by changing the voltage level of the ignition voltage according to the temperature caused by the heat radiation of the discharge lamp, a high voltage level of the ignition voltage which is necessary for lighting the discharge lamp at a high temperature can be supplied to the discharge lamp when the discharge lamp is at a high temperature and on the other hand, a low voltage level of the ignition voltage which is sufficient for lighting the discharge lamp at a normal temperature can be supplied to the discharge lamp when the discharge lamp is at a normal temperature.

In this way the discharge lamp can be lighted or turned on when the discharge lamp is in its high temperature condition and at the same time it is avoided from supplying unnecessary high voltage level of the ignition voltage to the discharge lamp in its normal temperature condition, so that the deterioration degree of the electrodes of the discharge lamp becomes smaller and it causes lengthening of the life time of the discharge lamp.

In more detail for an example of this discharge lamp lighting apparatus, the discharge pulse supplying means includes a capacitor for charging a supplied voltage and a transformer for stepping-up the charged voltage of that capacitor; the control means is connected to a negative or positive thermistor; and a switching device for switching whether or not supplying a voltage from the capacitor to the transformer; wherein when the switching device is switched such that a voltage is supplied from the capacitor to the transformer, the voltage level of the charged voltage of the capacitor is made to change in accordance with the resistance value of the negative or positive thermistor where it is suitable to design that the negative or positive thermistor is used both for the aforesaid detecting means and the control means.

In view of the afore mentioned aspects, the voltage level of the ignition voltage can be changed in response to the temperature cased by the heat radiation of the discharge lamp only by adding a simple circuit such as a thermistor and a switching device.

Subsequently, the present applicant proposes a lighting apparatus which comprises a discharge lamp, means for supplying an ignition voltage to the discharge lamp, means for supplying a drive current to the discharge lamp, detecting means for detecting the temperature caused by the heat radiation of the discharge lamp, and control means for changing the voltage level of the ignition voltage in response to the detected result of the detecting means. In this example, the lighting apparatus means a combined one-body apparatus of the discharge lamp and the discharge lamp lighting apparatus.

According to this lighting apparatus, just same as the above mentioned discharge lamp lighting apparatus of the present invention, the discharge lamp can be lighted or turned on when the discharge lamp is at its high temperature condition and the life time of the discharge lamp will be lengthened.

Additionally the present applicant proposes a projection type display apparatus using a discharge lamp as a light source which comprises means for supplying an ignition voltage to the discharge lamp, means for supplying a drive current to the discharge lamp, detecting means for detecting the temperature caused by the heat radiation of the discharge lamp, and control means for changing the voltage level of the ignition voltage in response to the detected result of the detecting means.

According to this projection type display apparatus, just same as the above mentioned discharge lamp lighting apparatus of the present invention, the discharge lamp can be lighted or turned on even when the discharge lamp is at its high temperature condition. Accordingly, when the projection type display apparatus is turned off after it is used for long hours and then it is soon turned on again, the video image can be projected at once, so that it becomes easy for users to handle the projection type display apparatus. At the same time the life time of the discharge lamp will be lengthened.

DESCRIPTION OF THE PREFERRED EMBODIMENTS

An example of the present invention that is applied to an LCD projector will be concretely described with reference to the drawings.

Figure 1:
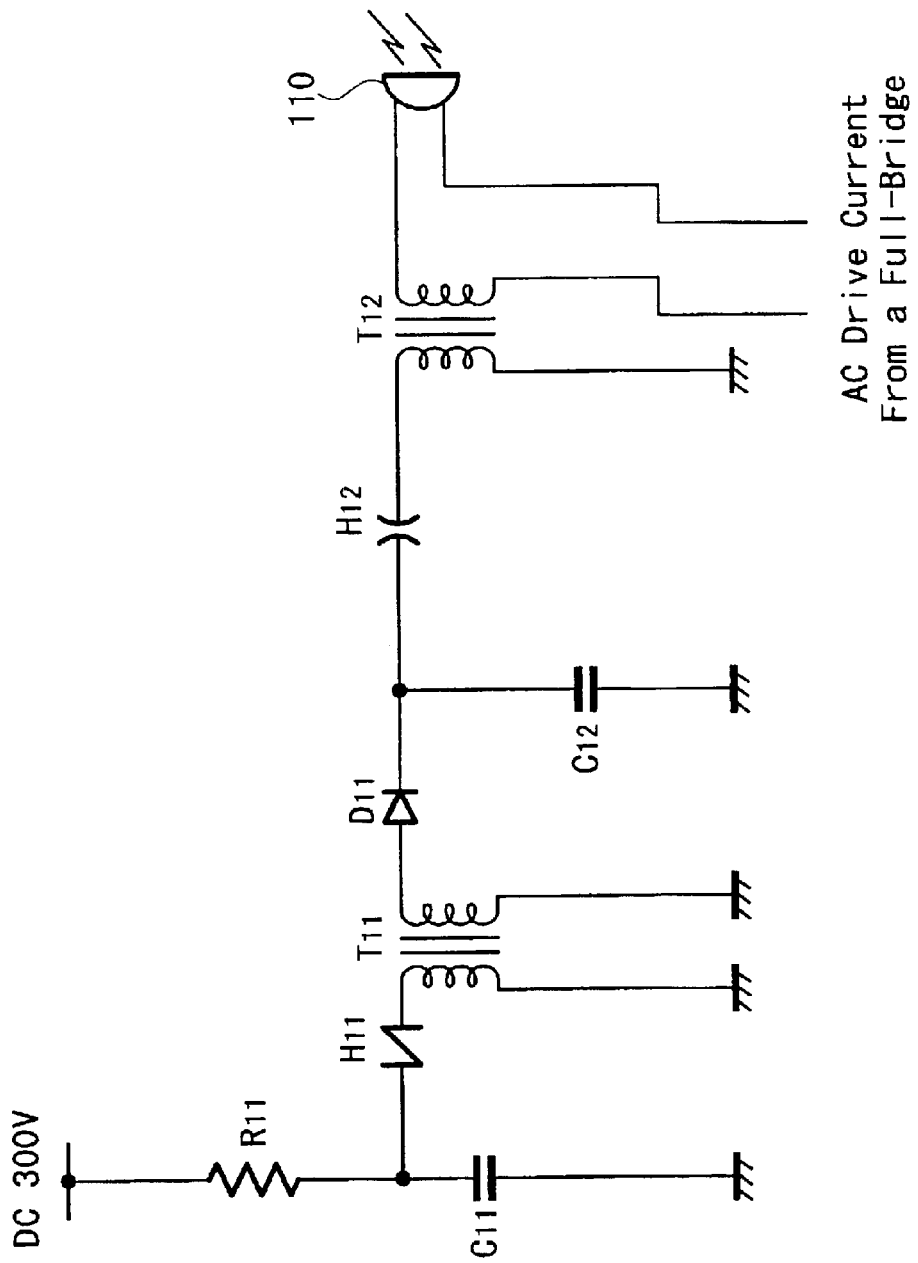
FIG. 1 is a schematic diagram showing a constitutional example of a conventional ignition circuit of a discharge lamp lighting apparatus.
Figure 2:
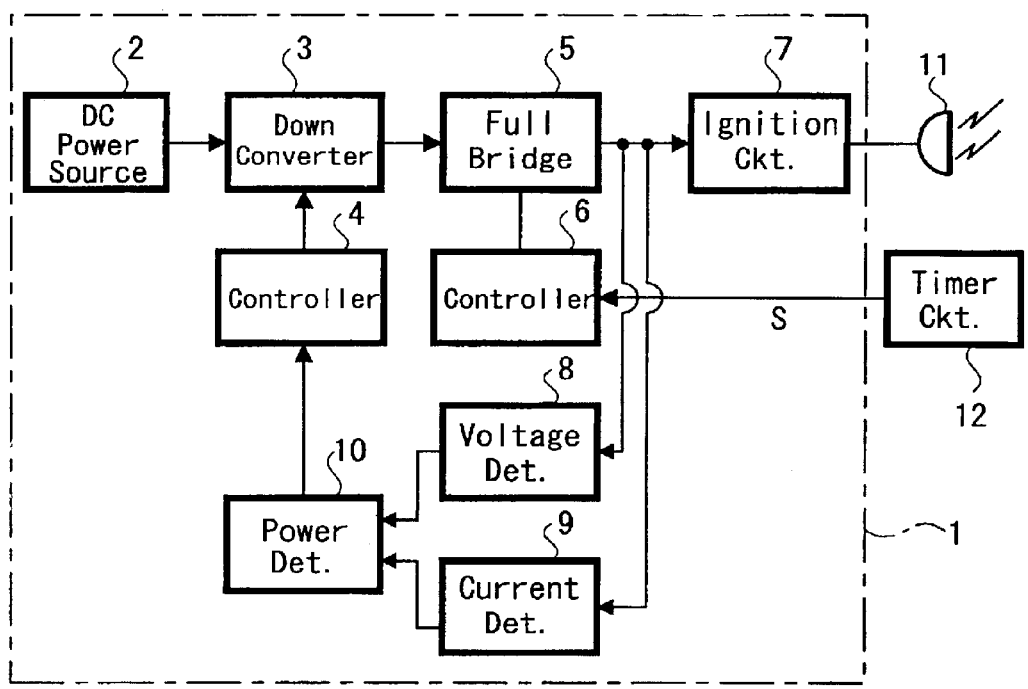
FIG. 2 is a schematic diagram showing a whole construction of a discharge lamp lighting apparatus and peripheral portions thereof for an LCD projector to which the present invention is applied.

FIG. 2 shows a whole construction of a discharge lamp lighting apparatus and peripheral portions thereof provided in an LCD projector to which the present invention is applied. The LCD projector is a video display apparatus where a light emitted from a discharge lamp 11 is irradiated to an LCD panel (not shown) and the video light obtained by modulating the LCD panel in accordance with a video signal is projected by projection lens (not shown) to display a video image. In this discharge lamp lighting apparatus, a DC power source 2 formed by an active filter and the like supplies a DC voltage of approximately 370V to a down converter 3.

The down converter 3 is a step-down type switching power supply and an operation of stepping-down the voltage is performed by switching and smoothing the input DC voltage in response to a frequency (frequency in the region of 50 to 100 kHz) determined by a controller 4.

When lighting the discharge lamp 11 (just after the power supply of the LCD projector is turned on), the controller 4 determines the frequency such that the voltage is stepped-down to a voltage of approximately 300V (a voltage necessary for an ignition circuit 7 which will be described later to generate a high voltage pulse).

The controller 4 also determines the frequency such that the voltage is stepped-down to a voltage of approximately 50 to 100V which is sufficient for maintaining the lighting of the discharge lamp 11.

The outputted DC voltage from the down converter 3 is supplied to a full-bridge 5. The full-bridge 5 converts the DC voltage from the down converter 3 to an AC current (drive current of the discharge lamp 11) having a frequency determined by a controller 6.

Figure 3:
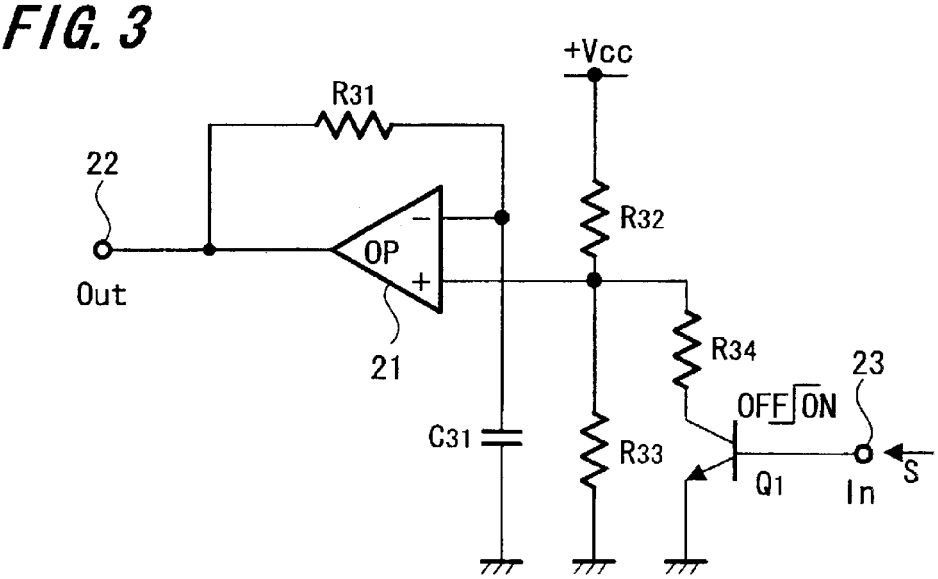
FIG. 3 is a schematic diagram showing a constitutional example of a controller 6 in FIG. 2.

FIG. 3 shows a schematic circuit configuration of the controller 6. A power line of a power source Vcc is grounded by means of a resistor R32 (100KΩ) and a resistor R33 (100K Ω). A connection midpoint of the resistor R32 and the resistor R33 is connected to a + (plus) terminal of an OP amplifier 21.

An output terminal of the OP amplifier 21 is grounded by means of a resistor R31 (100KΩ) and a capacitor C31 (0.1

μF). A connection midpoint of the resistor R31 and the capacitor C31 is connected to − (minus) terminal of the OP amplifier 21. The output signal of the OP amplifier 21 is supplied to the full-bridge 5 through an output terminal 22.

The connection midpoint of the resistor R32 and the resistor R33 is also connected to a collector of a transistor Q1 by means of a resistor R34 (100KΩ). The emitter of the transistor Q1 is grounded.

As shown in FIG. 2, the controller 6 is supplied with a signal s which turns on the transistor Q1 from a timer circuit of a control system in the LCD projector for some seconds (e.g. for 2 seconds). As shown in FIG. 3, the base of the transistor Q1 is supplied with the signal s through an input terminal 23 of the controller 6.

In the controller 6, the resistance value of the resistor R31 and the capacitance value of the capacitor C31 form a coefficient for determining the reference frequency. Then, the output waveform of the OP amplifier 21 (namely the output waveform for the full-bridge 5) when the transistor Q1 is in an OFF state is determined by those values and the resistance values of the resistors R32 and R33.

FIG. 4B shows a waveform of an AC drive current which is outputted from the full-bridge 5 when the transistor Q1 is in its OFF state The output waveform this time becomes a symmetrical one (the plus period and the minus period are equal) having a frequency of approximately 170 Hz.

On the other hand when the transistor Q1 is in its ON state, the voltage of the connection midpoint of the resistor R32 and the resistor R33 (namely the voltage at the + input terminal of the OP amplifier 21) changes, so that the output waveform of the full-bridge 5 changes, as shown in FIG. 4C, to an asymmetrical one where the plus period becomes much longer than the minus period.

In more detail of the controller 6, the circuit portions other than the resistor 34 and the transistor Q1 correspond to a conventional controller which is used for determining the frequency of the AC drive current in a conventional AC drive type discharge lamp lighting apparatus, and the waveform shown in FIG. 4B corresponds to the AC drive current of that conventional AC drive type discharge lamp lighting apparatus.

Accordingly the controller 6 can make the waveform of the AC drive current change to an asymmetrical waveform where the plus period becomes much longer than the minus period merely by adding a circuit of a resistor R34 and a transistor Q1 to a conventional controller.

As shown in FIG. 2, an output of the full-bridge 5 is transmitted to an ignition circuit 7. Additionally, an output voltage and an output current of the full-bridge 5 are respectively detected by a voltage detector circuit 8 and a current detector circuit 9 where the output power of the full-bridge 5 is detected by a power detector 10 in response to the detected results therefrom. A signal showing the detected result of the power detector 10 is transmitted to the aforesaid controller 4.

Figure 5:
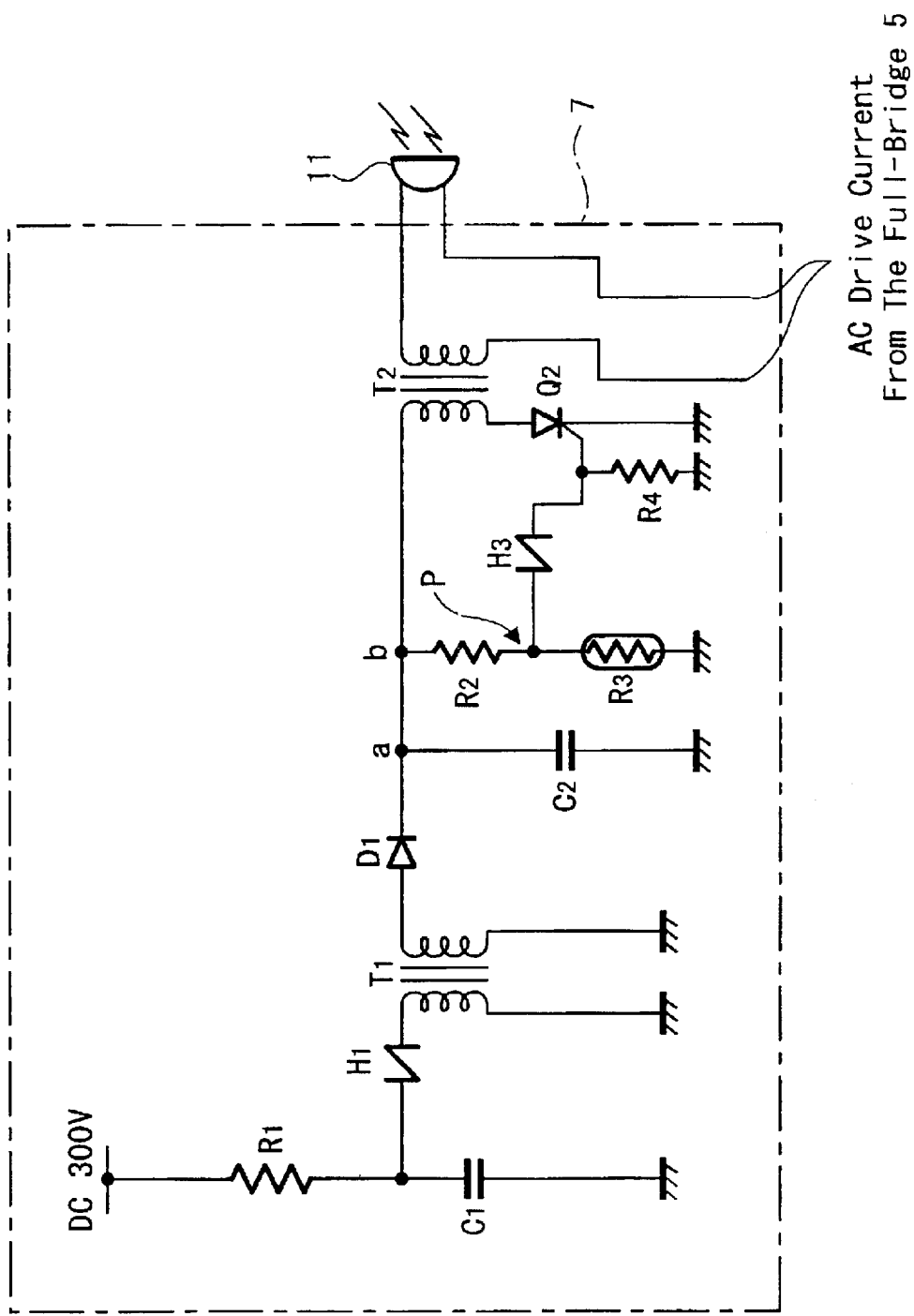
FIG. 5 is a schematic diagram showing a constitutional example of the ignition circuit 7 in FIG. 2.

FIG. 5 shows a circuit configuration of the ignition circuit 7 according to one exemplified embodiment of the present invention. A power supply line to which a DC voltage is supplied by means of the down converter 3 through the full-bridge 5 is grounded via a resistor R1 (18KΩ) and a capacitor C1 (0.022 μF).

A connection midpoint of the resistor R1 and the capacitor C1 is connected to one terminal of a primary coil of a step-up transformer H1 having a winding ratio 3:10 through a discharge device H1 such as a SIDAC. The discharge start voltage of the discharge device H1 is selected to be approximately 200V. The other terminal of the primary coil of the step-up transformer T1 is grounded.

One terminal of the secondary coil of the step-up transformer T1 is grounded and the other terminal thereof is connected to one terminal of a primary coil of a step-up transformer T2 having a winding ratio 1:20 through a diode D1. The other terminal of the primary coil of the step-up transformer T2 is connected to an anode of a three terminal thyristor Q2. The cathode of the three terminal thyristor Q2 is grounded.

A connection midpoint a of the diode D1 and the step-up transformer T2 is grounded by means of a capacitor C2 (0.047 μF). Additionally a connection midpoint b of the diode D1 and the step-up transformer T2 (namely a connection midpoint which is nearer to the step-up transformer T2 than the connection midpoint which is grounded through the capacitor C2) is grounded by means of a resistor R2 (300Ω) and a thermistor R3.

The thermistor R3 has a resistance value of a negative temperature coefficient and has a resistance value of, for example, 20KΩ at a normal temperature while it has a resistance value of approximately 10KΩ at a high temperature (60 to 8° C.) as a nearby temperature of the discharge lamp 11 just after a long time lighting thereof is performed.

A connection midpoint P of the resistor R2 and the thermistor R3 is connected to the gate of the three terminal thyristor Q2 through a discharge device H3 such as a SIDAC. The discharge start voltage of the discharge device H3 is selected such as 10 to 20V. A connection midpoint of the discharge device H3 and the three terminal thyristor Q2 is grounded through a resistor R4 which is provided as a countermeasure relating to noises at the gate. of the three terminal thyristor Q2.

The discharge lamp 11 is mounted to the discharge lamp lighting apparatus 1 such that one electrode out of 2 electrodes thereof is connected to a terminal of a secondary coil of the transformer T2.

Additionally a signal line for supplying an AC drive current from the full-bridge to the discharge lamp 11 is connected to the secondary coil of the transformer T2.

Speaking of several grounded portions in the ignition circuit 7, the grounded portions from the secondary coil of the step-up transformer T1 to the primary coil of the step-up transformer T2 as seen from the left side of FIG. 5 are designed to be isolated from other grounded portions.

In the ignition circuit 7, when the discharge lamp 11 is lighted or turned on (just after the power supply of the LCD projector is turned on), the capacitor C1 is charged through the resistor R1 by the approximately 300V from the down converter 3. Thereafter, when the charged voltage of the capacitor C1 reaches or attains to the discharge start voltage of the discharge device H1, a voltage is supplied from the capacitor C1 to the primary coil side of the step-up transformer T1 and the 10/3 stepped-up voltage at the secondary coil side of the step-up transformer T1 is charged to the capacitor C2 through the diode D1.

Subsequently, when a voltage at the connection midpoint P of the resistor R2 and the thermistor R3 resulted by the charged voltage of the capacitor C2 reaches the discharge start voltage of the discharge device H3, the three terminal thyristor Q2 turns on by the voltage supplied to the gate of the three terminal thyristor through the discharge device H3, so that a voltage pulse is supplied from the capacitor C2 to the primary side of the step-up transformer T2 and a 20 times stepped-up voltage pulse at the secondary side of the step-up transformer is supplied to the discharge lamp 11 as an ignition voltage.

The frequency of the ignition voltage (namely, the repetitive frequency of the ignition pulse) which is supplied from the ignition circuit 7 to the discharge lamp 11 becomes approximately 30 Hz.

In this case, since the ignition circuit 7 is positioned at a place having a relation with the change of the circumference temperature which is caused by the radiated heat of the discharge lamp 11 such as a place near the side wall of the discharge lamp contained in a lamp holder, the voltage at the connection midpoint P in a high temperature condition becomes half (½) of that in a normal temperature condition, because the resistance value of the thermistor R3 decreases from approximately 20KΩ to approximately 10KΩ as the temperature increases.

In more detail with reference to the ignition circuit 7, when the voltage of the connection midpoint P reaches the discharge start voltage of the discharge device H3 in a high temperature condition, the charged voltage of the capacitor C2 becomes approximately twice of that in a normal temperature condition, so that the ignition voltage of approximately twice higher voltage level is supplied to the discharge lamp 11.

The voltage level of the ignition voltage in a normal temperature condition is designed to be high enough to turn on the discharge lamp 11 in a normal temperature condition. Additionally, the voltage level of the ignition voltage in a high temperature condition is designed to be high enough to turn on the discharge lamp 11 in a high temperature condition just after it was lighted for a long time.

Next, the lighting operation of the discharge lamp 11 in the LCD projector will be described with respect to common operations of the discharge lamp 11 both in a normal and a high temperature conditions and thereafter separately with respect to different operations of the discharge lamp 11 from a normal to a high temperature conditions.

First, common operations both in a normal and a high temperature conditions are described hereinafter.

Just after a user turns on the power supply of the LCD projector, the transistor Q1 (FIG. 3) of the controller 6 is turned on in response to the signal s of the timer circuit (FIG. 2), so that a drive current of an asymmetrical waveform where the plus period becomes much longer than the minus period as shown in FIG. 4C is supplied to the discharge lamp 11.

At the same time, just after the power supply of the LCD projector is turned on, the discharge lamp 11 is supplied with the ignition voltage based upon the DC voltage of approximately 300V which is supplied to the ignition circuit 7 from the down converter 3 through the full-bridge 5.

FIG. 4A shows a waveform of an ignition voltage of the discharge lamp 11 at a normal temperature with the same timing scale as FIGS. 4B and 4C.

It should be noted that when the waveform of the ignition voltage is made to be plus at the timing when the waveform of the AC drive current is in the plus state and this state is maintained for a longer period than a certain period (namely, gas in the discharge lamp is made ionized), the discharge lamp is lighted based on the fact that a current continuously flows through the ionized gas.

On the other hand, when the waveform of the ignition voltage is made to be plus at the timing when the waveform of the AC drive current is in the minus state, the discharge lamp cannot be lighted.

Additionally, when the waveform of the ignition voltage is made to be plus at the timing when the waveform of the AC drive current is in the plus state while later on it turns to the minus direction in a short time, the discharge lamp cannot be lighted.

In this way, whether or not the discharge lamp will be lighted is determined by the timing when the waveform of the ignition voltage is made to be plus.

According to the discharge lamp lighting apparatus, as shown in FIGS. 4A to 4C, the waveform of the AC drive current is made in the plus direction at every timing t1 to t5 when the waveform of the ignition voltage is made to be plus and further the waveform of the AC drive current is maintained in the plus direction for a longer period than a certain period. Accordingly, the probability that the waveform of the ignition voltage becomes plus at the timing when the discharge lamp is lighted is made relatively high.

In FIG. 4A an ignition voltage in a condition of a normal temperature is shown, but when considering about an ignition voltage in a condition of a high temperature, the waveform of the AC drive current becomes asymmetrical as shown in FIG. 4C, so that the probability that the waveform of the ignition voltage becomes plus at the timing when the discharge lamp is lighted is made relatively high in the very same way.

In the above case, when the transistor Q1 of the controller is in its OFF state, an AC drive current such as shown in FIG. 4B is supplied to the discharge lamp 11 and this waveform is a similar waveform as that of the AC drive current in a discharge lamp lighting apparatus of conventional AC drive system.

Figure 4:
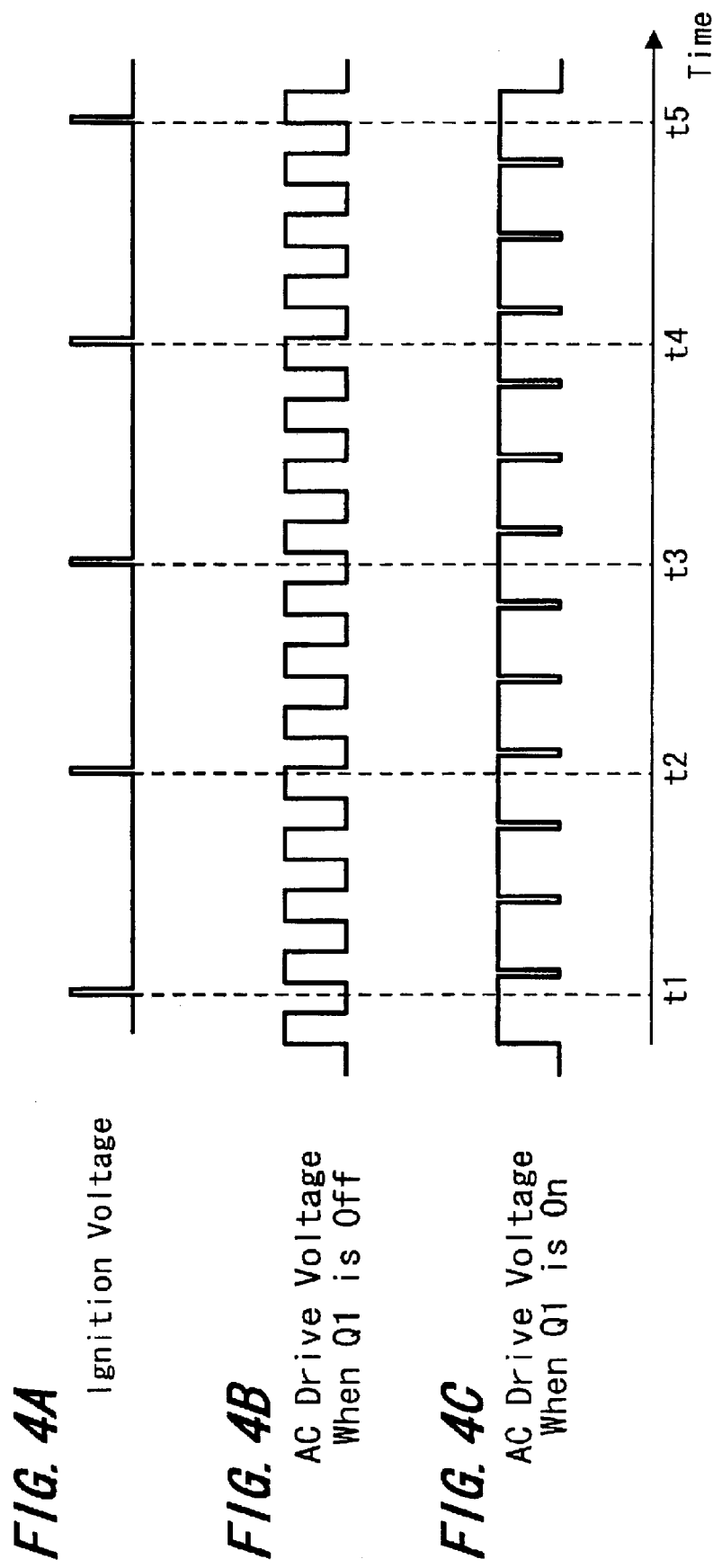
FIGS. 4A to 4C are waveform diagrams showing relationship between the ignition voltage waveform and the alternate current waveform of the discharge lamp lighting apparatus 1 in FIG. 2.

Supposing that a waveform of an AC drive current such as shown in FIG. 4B is supplied to the discharge lamp 11 just after the power supply of the LCD projector is turned on, the waveform of the AC drive current is in a plus condition and the timing t5 of FIG. 4 is only the timing when the waveform of the ignition voltage becomes plus condition and, at the same time, after when the AC drive current will maintain its plus condition for longer than a certain period. In more detail, the waveform of the AC drive current is in a minus condition at the timings t1 and t3 and the waveform of the AC drive current is in its plus condition at the timings t2 and t4 while it changes to its minus condition soon later. Accordingly, the probability that the waveform of the ignition voltage is made in a plus condition at the timing when the discharge lamp is lighted becomes relatively low.

When the probability for lighting the discharge lamp 11 is low as mentioned above, the ignition voltage should be supplied a long time until the discharge lamp 11 is lighted, so that it will take a long time to light the discharge lamp 11 (making video image projected) after the power supply of the LCD projector is turned on.

Additionally, if the ignition voltage is designed to be automatically shut-off in a period more than several seconds after, for example, the power supply of LCD projector is turned on where the discharge lamp 11 cannot be lighted even after the ignition voltage is continuously supplied, the user is forced to have an inconvenience whether he should wait for the restart of the ignition voltage or he should turn on the power supply again from the first.

According to the present LCD projector, to avoid such an inconvenience of the conventional apparatus, an AC drive current of a waveform not of a symmetrical one, but of a converted asymmetrical one where the plus period becomes much longer than the minus period is supplied to the discharge lamp 11, so that the probability that the wave form of the ignition voltage becomes in a plus condition at the timing when the discharge lamp is lighted is made relatively high.

In this way, in a short time after the power supply is turned on (namely, approximately securely within a time of a few seconds when the transistor Q1 in the controller 6 is made on by the signal s from the timer circuit 12) the discharge lamp is made lighted and video image can be projected. Accordingly, the LCD projector becomes easy to handle for a user.

Further, the life time of the discharge lamp 11 will be lengthened owing to the fact that the deterioration degree of the electrodes of the discharge lamp 11 becomes small, because the time for applying the ignition voltage to the discharge lamp 11 becomes shortened. Therefore, users need not frequently ask for the after care of changing the discharge lamp 11 and the running cost of the LCD projector becomes low.

Additionally, such effects can be obtained only by adding a simple circuit of aforesaid resistor R4 and transistor Q1 to the conventional controller.

Next, different operations from a normal to a high temperature conditions will be described hereinafter.

When the power supply of LCD projector is turned on after a considerably long time from the time when the LCD projector was used last time, the discharge lamp 11 is in its normal temperature, such that the temperature of the thermistor R3 of the ignition circuit 7 near the discharge lamp 11 becomes a normal temperature.

On the other hand, when an LCD projector is turned off after it is used for long hours and then the projector is turned on at once again (for example, just after the projector is used in one room and is delivered to a next room to be used therein), the discharge lamp is radiating heat and in a high temperature condition, so that the temperature of the thermistor R3 is also becomes high.

Therefore, when the discharge lamp 11 is in a high temperature condition, an ignition voltage of approximately twice higher voltage level than that in a normal temperature is supplied to the discharge lamp 11.

When the temperature of the discharge lamp 11 is high, the pressure of the low pressured gas enclosed in the discharge lamp increases, so that the discharge lamp 11 cannot be lighted or turned on unless an ignition voltage of a higher voltage than that of a normal temperature is supplied to the discharge lamp 11.

According to the present discharge lamp lighting apparatus 1, when the temperature of the discharge lamp 11 is high, an ignition voltage of a higher voltage level than that of a normal temperature is supplied to the discharge lamp 11, so that the discharge lamp 11 will be lighted or turned on even when an LCD projector is turned off after it is used for long hours and then the projector is turned on at once again.

Additionally, when the discharge lamp 11 is in its normal temperature, an ignition voltage of a relatively low voltage level is supplied to the discharge lamp 11, but the discharge lamp 11 can fully be lighted in response to an ignition voltage of such a low voltage level.

In a conventional AC drive type discharge lamp lighting apparatus, the voltage level of the ignition voltage is fixed and in case that the fixed voltage level is low, there is an inconvenience that the discharge lamp 11 cannot be lighted in its high temperature condition (in other words, users should wait until the temperature of the discharge lamp decreases), and further in case that the fixed voltage level is high, there is an inconvenience that the life time of the discharge lamp 11 is uselessly shortened, because an ignition voltage of an unnecessarily high voltage level is supplied to the discharge lamp when it is in a normal temperature condition.

According to the present LCD projector, in order to avoid the aforesaid inconvenience the voltage level of the ignition voltage is changed in accordance with the temperature caused by the heat radiation of the discharge lamp 11, such that when the temperature of the discharge lamp 11 is high, an ignition voltage of a high voltage level which is necessary for lighting the discharge lamp 11 can be supplied to the discharge lamp 11 when it is in a high temperature condition and on the other hand, when the temperature of the discharge lamp 11 is normal, an ignition voltage of a low voltage level which is enough for lighting the discharge lamp 11 will be supplied to the discharge lamp 11.

In view of the afore mentioned aspect, the discharge lamp 11 will be soon lighted or turned on and the video image can be projected even when the LCD projector is turned off after it is used for long hours and then the projector is soon turned on again. Therefore, in this point of view, too, the usability of the LCD projector is improved for users.

Additionally, an,ignition voltage of an unnecessarily high voltage level is not supplied to the discharge lamp 11 when it is in a normal temperature condition, so that deterioration degree of the electrodes of the discharge lamp 11 becomes smaller and it cases lengthening of the life time of the discharge lamp 11. Therefore, in this point, too, users need not frequently ask for the aftercare of changing the discharge lamp 11 and at the same time the running cost of the LCD projector becomes low.

It should be noted that the voltage level of the ignition voltage can be changed in response to the temperature cased by the heat radiation of the discharge lamp 11 only by adding a simple circuit such as the thermistor R3, the three terminal thyristor Q2 and the discharge device H3 instead of a discharge gap.

In the above mentioned example, when lighting the discharge lamp 11, the controller 6 changes or varies the waveform of the AC drive current outputted from the full-bridge 5 to an asymmetrical waveform where the frequency thereof is lowered and the plus period becomes much longer than the minus period as shown in FIGS. 4B and 4C.

However, for another example when lighting the discharge lamp 11, it is possible to change or vary the waveform of the AC drive current outputted from the full-bridge 5 to an asymmetrical waveform where the frequency thereof is maintained constant and the plus period becomes much longer than the minus period.

In the above mentioned example, when lighting the discharge lamp 11, probability that the waveform of the ignition voltage becomes plus at the timing when the discharge lamp is lighted is made high by changing the waveform of the AC drive current to an asymmetrical waveform.

However, for another example when lighting the discharge lamp 11, the probability that the waveform of the ignition voltage becomes plus at the timing when the discharge lamp is lighted is made high by synchronically controlling the waveform of the AC drive current relative to the ignition voltage (that is, by controlling the waveform of the AC drive current, such that it becomes plus and maintain this plus condition longer than a certain period at the timing when the discharge lamp is lighted)

Further, in the above mentioned example, the thermistor having a resistance ratio of approximately 1:2 for high and normal temperatures is provided in the ignition circuit 7, but it is possible or allowed that another thermistor having a different ratio other than 1:2 will be provided.

Further, in the above mentioned example, the connection midpoint of the diode D1 and the step-up transformer T2 is grounded by means of the resistor R2 and the thermistor R3 as shown in FIG. 5 However, for another example it is allowed that the connection midpoint is grounded by means of a positive thermistor and a resistor, such that a connection midpoint of the positive thermistor and the resistor is connected to the gate of the three terminal thyristor Q3 through the discharge device H3 in FIG. 5.

Further, in the above mentioned example, as shown in FIG. 5, the thermistor R3 is provided in the ignition circuit 7 where the thermistor R3 is an element having the both functions of detecting means for detecting the temperature caused by the heat radiation of the discharge lamp 11 and control means for changing the voltage level of the ignition voltage in response to the detected result of the detecting means (that is, changing the voltage of the connection midpoint P).

However, for another example, a resistor will be provided instead of the thermistor R3 at its position and the temperature caused by the heat radiation of the discharge lamp 11 will be detected by a temperature sensor such that another resistor will be connected in parallel with that resistor in order to lower the voltage of the connection midpoint P when the detected temperature by the temperature sensor is high.

In a further additional example, a variable resistor can be provided instead of the thermistor R3 at its position and the temperature caused by the heat radiation of the discharge lamp 11 will be detected by a temperature sensor such that the resistance value of the variable resistor will be lowered in order to lower the voltage of the connection midpoint P when the detected temperature by the temperature sensor is high.

For those cases above, the temperature sensor is not necessary to be provided in the ignition circuit 7 or in the discharge lamp lighting apparatus 1, but it can be provided, for example, near an air exhausting fan of the LCD projector, near an air exhausting exit (heat exhausting exit) of the LCD projector, at the inner wall of the cabinet of the LCD projector and the like, which is one of appropriate positions within the projector for detecting the temperature caused by the heat radiation of the discharge lamp 11.

Further, in the above mentioned example, as shown in FIG. 5, the ignition circuit 7 makes the voltage level of the ignition voltage high when the temperature of the discharge lamp 11 is high by increasing the voltage supplied from the capacitor C2 to the primary side of the step-up transformer T2.

However, for another example, it is allowed that the step-up ratio of the step-up transformer will be made larger when the temperature of the discharge lamp 11 is high, such that the voltage level of the ignition voltage is made high.

Figure 6:
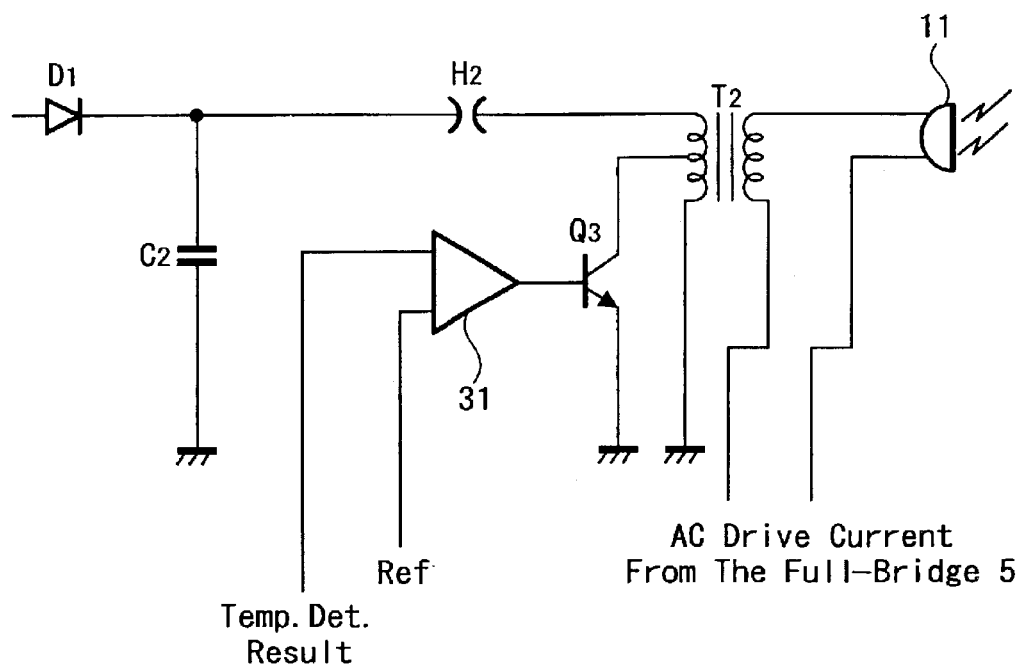
FIG. 6 is a schematic diagram showing another exemplified embodiment of the ignition circuit 7 in FIG. 2.

FIG. 6 shows an example where the portions succeeding to the diode D1 of FIG. 5 is modified such that the step-up ratio of the step-up transformer T2 can be made larger when the temperature of the discharge lamp 11 is high in which the same reference numerals are used for those corresponding to the portions of FIG. 5.

In this modified example, a discharge gap H2 is inserted between the diode D1 and the primary side of the step-up transformer T2 and the connection midpoint of the diode D1 and the discharge gap H2 is grounded through the capacitor C2. The discharge start voltage of the discharge gap H2 is selected as about 100V to 1 KV.

The collector of the transistor Q3 is connected to a certain portion of the primary coil of the transformer H2. The emitter of the transistor Q3 is grounded and the base of the transistor Q3 is connected to an output terminal of a comparator 31.

The temperature caused by the heat radiation of the discharge lamp 11 is detected by a temperature sensor (designation is omitted) and a signal showing the detected result is inputted to one input terminal of the comparator 31. The other input terminal of the comparator 31 is supplied with a reference signal Ref which shows a higher temperature than a normal temperature as a reference temperature.

When the detected result is higher than the reference temperature, the transistor Q3 is turned on, because an output signal from the comparator 31 is supplied to the base of the transistor Q3. Accordingly, in this case, the step-up ratio of the step-up transformer T2 becomes a ratio of the primary coil number of the transformer T2 seen from the connection midpoint of the transistor Q3 to the primary coil portion at the discharge gap H2 side relative to the secondary coil number of the transformer T2 (this becomes larger than 1:20).

In this way, when the temperature of the discharge lamp 11 is high, the step-up ratio of the step-up transformer T2 is made larger, so that the voltage level of the ignition voltage becomes higher.

Further, in the aforesaid example, the present invention is applied to a LCD projector provided with a discharge lamp lighting apparatus which. supplies an AC drive current to a discharge lamp. However, it is also applicable to a LCD projector provided with a discharge lamp lighting apparatus which supplies a DC drive current.to a discharge lamp.

Further, in the aforesaid example, the present invention is applied to LCD projectors, but it is also applicable to other than LCD projectors, for example, to projection type display apparatuses which use such as DMD (Digital Micro Mirror Device) other than LCD panels as light bulbs.

In view of the afore mentioned aspect, the present invention has advantages or effects that it becomes possible to light the discharge lamp when it is in a high temperature condition and the life time of the discharge lamp can be lengthened by changing the voltage level of the ignition voltage in accordance with the temperature caused by the heat radiation of the discharge lamp such that when the temperature of the discharge lamp is high, an ignition voltage of a high voltage level which is necessary for lighting the discharge lamp can be supplied to the discharge lamp when it is in a high temperature condition and on the other hand, when the temperature of the discharge lamp is normal, an ignition voltage of a low voltage level which is enough for lighting the discharge lamp will be supplied to the discharge lamp.

Additionally, it has also an advantage that the voltage level of the ignition voltage can be changed in accordance with the temperature caused by the heat radiation of the discharge lamp only by adding a simple circuit such as a thermistor or a switching device in the ignition circuit.

Further, especially according to a projection type display apparatus of the present invention, the video image can be projected at once even when the LCD projector is turned off after it is used for long hours and then the projector is soon turned on again, so that an advantage is obtained such that the usability of the projection type display apparatus is improved for users.

Having described preferred embodiments of the invention with reference to the accompanying drawings, it is to be understood that the invention is not limited to those precise embodiments and that various changes and modifications could be affected therein by one skilled in the art without departing from the spirit or scope of the invention as defined in the appended claims.

What is claimed is:

1. A discharge lamp lighting apparatus comprising:
   discharge pulse supplying means for supplying a high voltage pulse as an ignition voltage to cause a discharge lamp to be ignited,
   drive current supplying means for supplying a drive, current to said discharge lamp to maintain ignition of said discharge lamp,
   detecting means for detecting a temperature caused by heat radiated by said discharge lamp, and
   control means for increasing a voltage level of said high voltage pulse in response to a detected temperature result of said detecting means when said discharge lamp is reignited after said discharge lamp is turned off following a period of being ignited.

2. The discharge lamp lighting apparatus according to claim 1, wherein said discharge pulse supplying means comprises a capacitor for charging a supplied voltage, and a transformer for stepping-up a charged voltage of said capacitor and for supplying a stepped-up voltage to said discharge lamp; and said control means comprises a switching device for switching a supplying of the charged voltage from said capacitor to said transformer in response to an output of a thermistor having a resistance value that changes in accordance with an ambient temperature, wherein when said switching device is switched such that the charged voltage is supplied from said capacitor to said transformer, the voltage level of the charged voltage of said capacitor is made to change in accordance with the resistance value of said thermistor, and wherein said thermistor is used for said detecting means and said control means.

3. The discharge lamp lighting apparatus according to claim 1, wherein said discharge pulse supplying means comprises a capacitor for charging a supplied voltage, and a transformer for stepping-up the charged voltage of said capacitor and for supplying the stepped-up voltage to said discharge lamp; and said control means comprises a comparator for comparing a signal designating the detected temperature detected by said detecting means with a signal designating a reference temperature and for outputting a compared signal based on a compared result, and step-up ratio changing means for changing a step-up ratio of said transformer wherein said step-up ratio changing means is controlled for changing said high voltage pulse in response to said compared signal from said comparator.

4. The discharge lamp lighting apparatus according to claim 1, wherein said drive current supplying means supplies an AC drive current and is provided with a waveform conversion means for converting a waveform of said AC drive current to a waveform having a plus period longer than a minus period.

5. A light source apparatus comprising:
   a discharge lamp,
   discharge pulse supplying means for supplying a high voltage pulse as an ignition voltage to cause said discharge lamp to be ignited,
   drive current supplying means for supplying a drive current to said discharge lamp to maintain ignition of said discharge lamp,
   detecting means for detecting a temperature caused by heat radiated by said discharge lamp, and
   control means for increasing a voltage level of said high voltage pulse in response to a detected temperature result of said detecting means when said discharge lamp is reignited after said discharge lamp is turned off following a period of being ignited.

6. The light source apparatus according to claim 5, wherein said drive current supplying means supplies an AC drive current and is provided with a waveform conversion means for converting a waveform of said AC drive current to a waveform having a plus period longer than a minus period.

7. A projection type display apparatus comprising:
   discharge pulse supplying means for supplying a high voltage pulse as an ignition voltage to cause a discharge lamp to be ignited,
   drive current supplying means for supplying a drive current to said discharge lamp to maintain ignition of said discharge lamp,
   detecting means for detecting a temperature caused by heat radiated by said discharge lamp, and
   control means for increasing a voltage level of said high voltage pulse in response to a detected temperature result of said detecting means when said discharge lamp is reignited after discharge lamp turned off following a period of being ignited.

8. The projection type display apparatus according to claim 7, wherein said drive current supplying means supplies an AC drive current and is provided with a waveform conversion means for converting waveform of said AC drive current to a waveform having a plus period longer than a minus period.

9. The projection type display apparatus according to claim 8 further comprising: a timer for outputting a signal of a predetermined period to said waveform conversion means in response to an operation signal from a user, wherein said waveform conversion means converts the waveform of said AC drive current to a waveform having a plus period longer than a minus period when the signal is output from said timer and converts the waveform of said AC drive current to a waveform having a plus period equal to a minus period when the signal is output from said timer.

* * * * *